United States Patent
Watanabe (10) Patent No.: US 6,572,202 B2
(45) Date of Patent: Jun. 3, 2003

(54) VEHICLE BRAKE CONTROL SYSTEM AND METHOD THEREFOR

(75) Inventor: Ryochi Watanabe, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/165,964

(22) Filed: Jun. 11, 2002

(65) Prior Publication Data

US 2002/0185913 A1 Dec. 12, 2002

(30) Foreign Application Priority Data

Jun. 11, 2001 (JP) ........................................ 2001-175401

(51) Int. Cl.$^7$ ................................................. B60T 8/66
(52) U.S. Cl. ........................ 303/167; 303/147; 303/148; 303/182; 303/20
(58) Field of Search ............................ 303/3, 9.62, 9.71, 303/15, 140, 146, 147, 148, 149, 150, 160, 161, 166, 167, 170, 181, 182, 183, 20

(56) References Cited

U.S. PATENT DOCUMENTS

| | | | | |
|---|---|---|---|---|
| 5,928,302 A | * | 7/1999 | Fukada | 701/70 |
| 6,131,054 A | * | 10/2000 | Shibahata | 701/1 |
| 6,139,120 A | * | 10/2000 | Fukada | 303/146 |
| 6,266,601 B1 | * | 7/2001 | Soga et al. | 701/74 |
| 6,282,479 B1 | * | 8/2001 | Ghoneim et al. | 701/70 |
| 6,315,373 B1 | * | 11/2001 | Yamada et al. | 303/191 |
| 6,456,920 B1 | * | 9/2002 | Nishio et al. | 701/70 |

FOREIGN PATENT DOCUMENTS

JP         A-6-127354          5/1994

* cited by examiner

*Primary Examiner*—Christopher P. Schwartz
*Assistant Examiner*—Devon Kramer
(74) *Attorney, Agent, or Firm*—Oliff & Berridge, PLC

(57) ABSTRACT

A method and brake control system that calculates a target brake pressure of each wheel based on a braking amount by a vehicle operator and a product of a lateral acceleration of the vehicle and a vehicle speed. The brake control system comprises a first detector that detects a lateral acceleration of the vehicle and a second detector that detects a speed of the vehicle. A controller is provided that controls a braking force applied to each of front wheels and rear wheels. The controller increases the braking force applied to the front wheels by a vehicle operator so that the ratio of the braking force applied to the front wheels versus the braking force applied to the rear wheels increases as a product of the detected lateral acceleration and the detected speed of the vehicle increases.

16 Claims, 7 Drawing Sheets

VEHICLE BRAKE CONTROL SYSTEM AND METHOD THEREFOR

INCORPORATION BY REFERENCE

The disclosure of Japanese Patent Application No. 2001-175401 filed on Jun. 11, 2001 including the specification, drawings and abstract is incorporated herein by reference in its entirety.

BACKGROUND OF THE INVENTION

1. Field of Invention

This invention generally relates to a brake control system of a vehicle such as an automobile. More particularly, the invention relates to a brake control system that ensures driving stability of a vehicle when braking the vehicle while turning.

2. Description of Related Art

Conventionally a brake control system of a vehicle, such as an automobile, which controls front and rear wheel braking force distribution, such that the yaw rate of the vehicle, becomes a constant target yaw rate when braking the vehicle while turning. This technology is disclosed in Japanese Patent Application Laid-Open Publication No. 6-127354. This brake control system is intended to improve the driving stability when braking the vehicle while turning by preventing the yaw rate of the vehicle from increasing at that time.

According to the brake control system disclosed in JP 6-127354, however, complex calculations are required which makes it difficult to apply to actual vehicles. Further, this brake control system controls the front and rear wheel braking force distribution such that the yaw rate of the vehicle becomes a constant target yaw rate when braking the vehicle while turning by reducing the braking force of the rear wheels. As a result, the deceleration of the vehicle is reduced compared to when front and rear wheel braking force distribution control is not performed.

SUMMARY OF THE INVENTION

An object of the invention is to easily and effectively prevent an increase in a yaw rate of the vehicle when braking the vehicle while turning without deteriorating the deceleration of the vehicle by controlling the front and rear wheel braking force distribution with a simple calculation without relying only on the control for decreasing the rear wheel braking force.

According to one aspect of the invention, a method and brake control system for a vehicle includes a first detector that detects a lateral acceleration of the vehicle, a second detector that detects a speed of the vehicle, and a controller that controls a braking force applied to each of front wheels and rear wheels. The controller increases the braking force applied to at least the front wheels so that the ratio of the braking force applied to the front wheels versus the braking force applied to the rear wheels increases as a product of the detected lateral acceleration and the detected speed of the vehicle increases.

According to the aspect of the invention, the controller increases the braking force applied to the front wheels when an absolute value of a product of the detected lateral acceleration and the detected speed of the vehicle is equal to or greater than a first predetermined value and is less than a second predetermined value. The controller increases the braking force applied to the front wheels and decreases the braking force applied to the rear wheels when the absolute value of the product of the detected lateral acceleration and the detected speed of the vehicle is equal to or greater than the second predetermined value.

According to the aspect of the invention, the controller corrects an amount of increase in the braking force applied to the front wheels on the basis of the absolute value of the product of the detected lateral acceleration and the detected speed of the vehicle so as to prevent the braking force applied to the front wheels from exceeding a predetermined range when a braking amount of the vehicle by an operator of the vehicle becomes large.

According to the aspect of the invention, the controller determines whether the vehicle is turning while braking, and controls the braking force applied to at least one of the front wheels and rear wheels on the basis of the absolute value of the product of the detected lateral acceleration and the detected speed of the vehicle when it is determined that the vehicle is turning while braking.

In the aforementioned aspect of the invention, the yaw rate Yr of the vehicle can be expressed by Equation 1 below:

$$Yr = (1 + Kh \times V \times V) \vert \times (\theta \times V)/(N \times L) \tag{1}$$

where Kh represents a stability factor, V represents a vehicle speed, $\theta$ represents a steering angle, N represents a steering gear ratio, and L represents a wheel base.

Multiplying both sides of Equation 1 by $(1+Kh \times V \times V)$ results in Equation 2 below. Supposing that the lateral acceleration of the vehicle is denoted by Gy, Equation 3, as shown below, can be obtained using the relationship $Gy = Yr \times V$.

$$Yr + Kh \times (Yr \times V) \times V = (\theta \times V)/(N \times L) \tag{2}$$

$$Yr = (\theta \times V)/(N \times L) - Kh \times Gy \times V \tag{3}$$

Generally, when braking is performed while steadily turning in an actual vehicle, the vehicle tends to pull inward toward the inside of the turn regardless of whether the steering angle is constant. This phenomenon, that is, the increase in the yaw rate Yr is undesirable.

When applying this phenomenon to Equation 3 above, supposing that the change in the vehicle speed before and after braking operation is small, the yaw rate before braking denoted as Yr1 and the yaw rate after braking denoted as Yr2 can be expressed by Equations 4 and 5, respectively, below.

$$Yr1 = (\theta \times V)/(N \times L) - Kh1 \times Gy \times V \tag{4}$$

$$Yr2 = (\theta \times V)/(N \times L) - Kh2 \times Gy \times V \tag{5}$$

Therefore, in order to suppress an increase in the yaw rate Yr, expressed by Yr2>Yr1 in the aforementioned phenomenon, the value of the amount of change in the yaw rate expressed by Equation 6 below need only be made smaller.

$$Yr2 - Yr1 = (Kh1 - Kh2) \times Gy \times V \tag{6}$$

There is a tendency for the stability factor Kh to become larger as more braking force is distributed to the front wheels. It is thus understood that in order to suppress an increase in the yaw rate Yr after braking at turning of the vehicle, the value (Kh1−Kh2) needs only be made smaller as the product of Gy (lateral acceleration) and V (vehicle speed) becomes larger.

In the brake control system according to the aspect of the invention, the brake control system controls the braking force of the front wheels or rear wheels such that more braking force is distributed to the front wheels than to the rear wheels, as the product of the lateral acceleration of the vehicle and the vehicle speed becomes greater. As a result, an increase in the yaw rate when braking the vehicle while turning can be easily and effectively prevented without requiring complicated calculations. Further, because more braking force is distributed to the front wheels than to the rear wheels due to the fact that the braking force of at least the front wheels is increased, it is possible to reliably prevent a reduction in deceleration of the vehicle caused by a reduction in braking force of the entire vehicle.

In the brake control system according to the aspect of the invention, when the product of the lateral acceleration of the vehicle and the vehicle speed is equal to, or greater than, a first reference value and less than a second reference value, the braking force of the front wheels is increased. Further, when the product of the lateral acceleration of the vehicle and the vehicle speed is equal to, or greater than, the second reference value, the braking force of the front wheels is increased and the braking force of the rear wheels is decreased. Therefore, the possibility of the braking force of the front wheels becoming excessive is reduced while more braking force is reliably distributed to the front wheels than to the rear wheels.

In the brake control system according to the aspect of the invention, when the amount of braking operation applied by the vehicle operator is large, the increase amount of the braking force applied to the front wheels, which is based on the product of the lateral acceleration of the vehicle and the vehicle speed, is corrected such that the braking force of the front wheels is prevented from exceeding a predetermined range. Therefore, it is possible to reliably reduce the possibility of a decrease in the turning characteristics of the vehicle due to the braking force of the front wheels becoming excessive such that the lateral force of the front wheels is reduced when a large amount of braking operation is applied by the vehicle operator.

In the brake control system according to the aspect of the invention, it is determined whether the vehicle is in a state of turning while braking. If the vehicle is in a state of turning while braking, the braking force of the front wheels or rear wheels is controlled based on the product of the lateral acceleration of the vehicle and the vehicle speed. Therefore, it is possible to both reliably prevent the yaw rate of the vehicle from increasing when the vehicle is in a state of turning while braking, as well as reliably prevent distribution control of the braking force from being performed unnecessarily when the vehicle is not in a state of turning while braking.

According to an exemplary embodiment of the aspect of the invention, the controller calculates a target braking force applied to each of the front wheels and the rear wheels on the basis of a braking amount of the vehicle by an operator of the vehicle, and corrects the target braking force applied to the front wheels so as to be increased as an absolute value of the product of the detected lateral acceleration and the detected speed of the vehicle increases.

According to another exemplary embodiment of the aspect of the invention, a rate of increase in the braking force applied to the front wheels, when the absolute value of the product of the detected lateral acceleration and the detected speed of the vehicle is equal to or greater than the second predetermined value, is smaller than the rate of increase in the braking force applied to the front wheels when the absolute value of the product of the detected lateral acceleration and the detected speed of the vehicle is equal to or greater than the first predetermined value and less than the second predetermined value.

According to another exemplary embodiment of the aspect of the invention, when the absolute value of the product of the detected lateral acceleration and the detected speed of the vehicle is equal to or greater than the second predetermined value, the controller reduces the braking force applied to one of the rear wheels on the inside of turning of the vehicle as the absolute value of the product increases.

According to another exemplary embodiment of the aspect of the invention, when the absolute value of the product of the detected lateral acceleration and the detected speed of the vehicle is equal to or greater than the second predetermined value, the controller reduces the braking force applied to one of the rear wheels on the inside of turning of the vehicle as the absolute value of the product becomes larger, and increases the braking force applied to the other of the rear wheels on the outside of turning of the vehicle as the absolute value of the product.

According to another exemplary embodiment of the aspect of the invention, the controller determines whether a road on which the vehicle is travelling has an uneven friction coefficient that is different in right and left areas of the road which correspond to the respective right and left wheels, and inhibits controlling of the braking force applied to the at least one of the front wheels and the rear wheels on the basis of the absolute value of the product of the detected lateral acceleration and the detected speed of the vehicle when it is determined that the road has the uneven friction coefficient that is different in right and left areas of the road.

DETAILED DESCRIPTION OF EXEMPLARY EMBODIMENTS

Hereinafter the exemplary embodiments of the invention will be described with reference to the accompanying drawings.

Figure 1A:
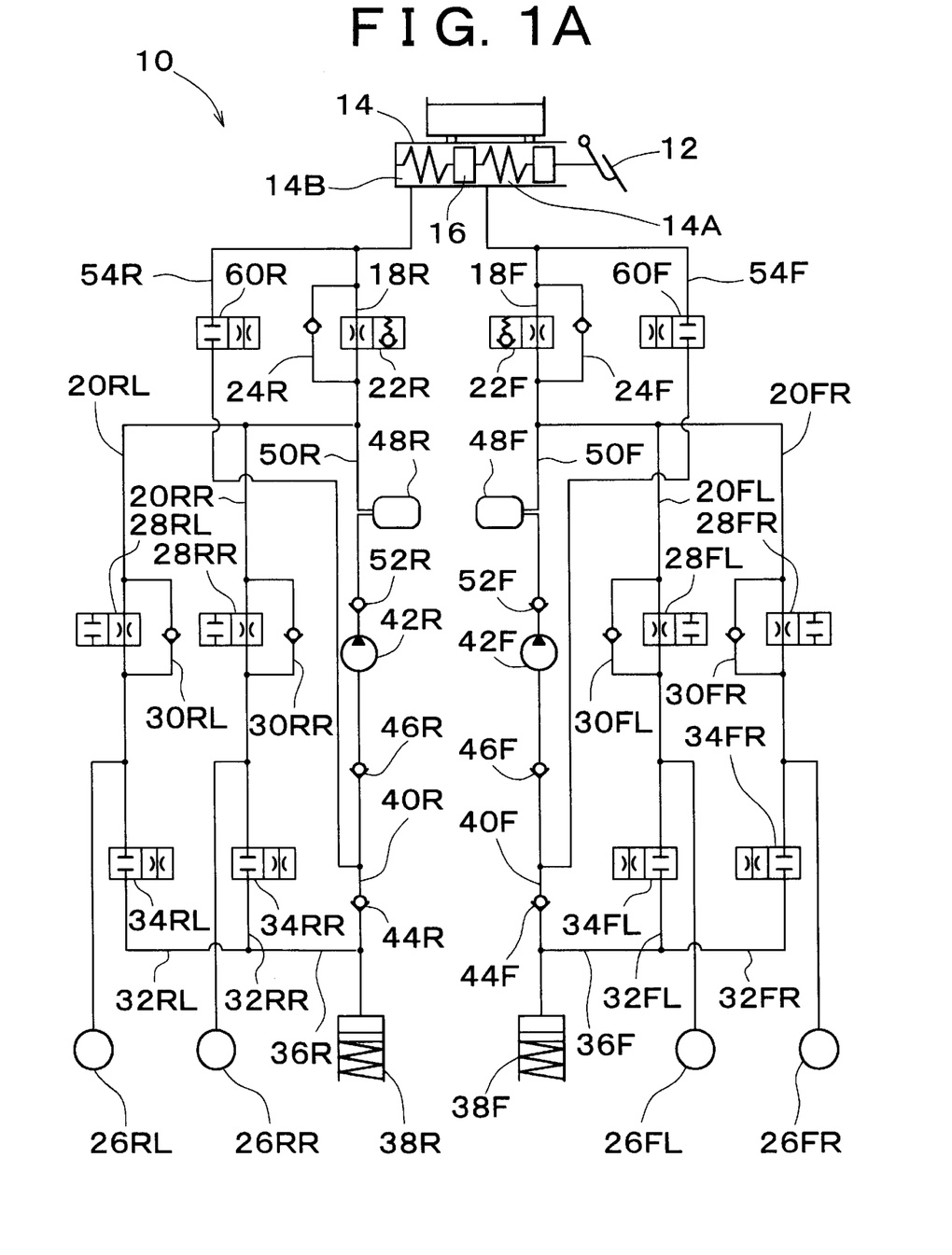
FIG. 1A is a block diagram schematically showing a hydraulic circuit of one exemplary embodiment of a brake control system according to the invention.
Figure 1B:
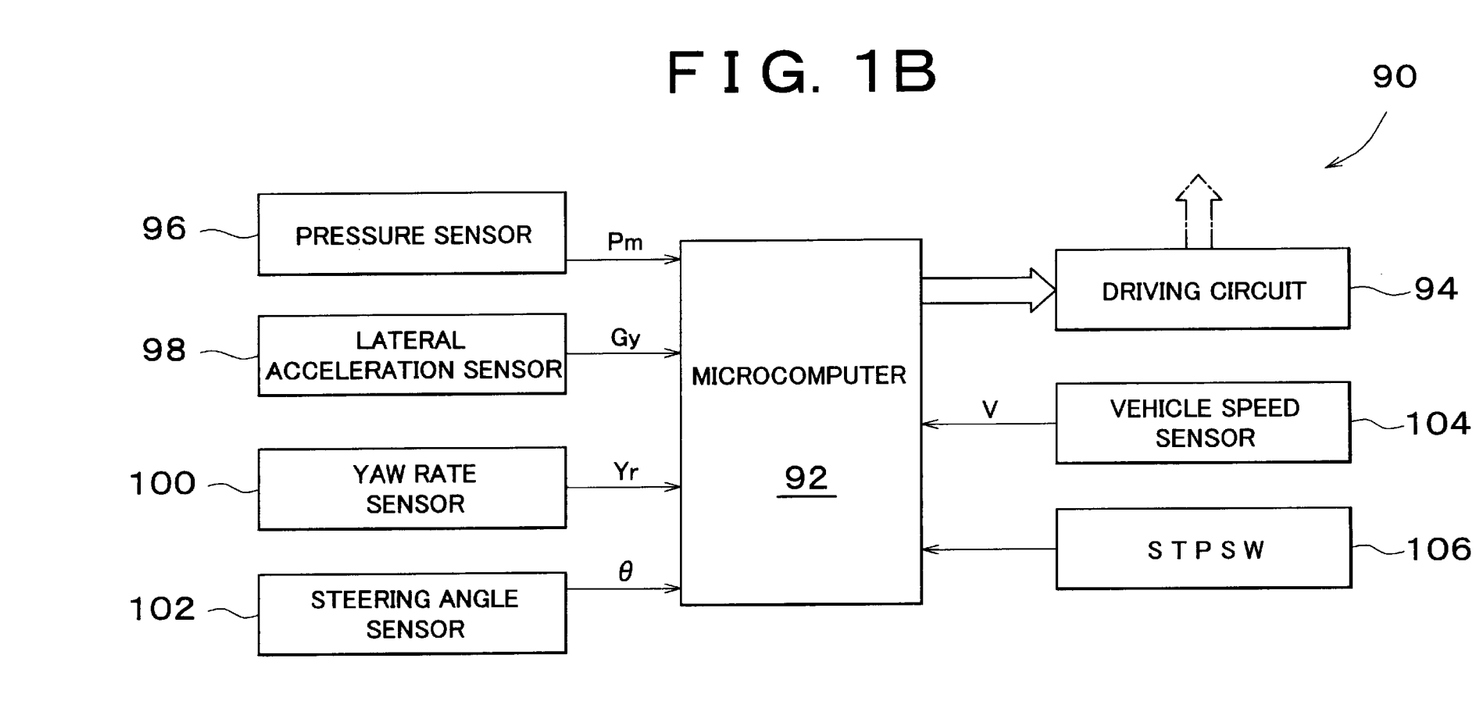
FIG. 1B is a block diagram schematically showing an electronic control unit of the brake control system for controlling the hydraulic circuit shown in FIG. 1A.
Figure 2:
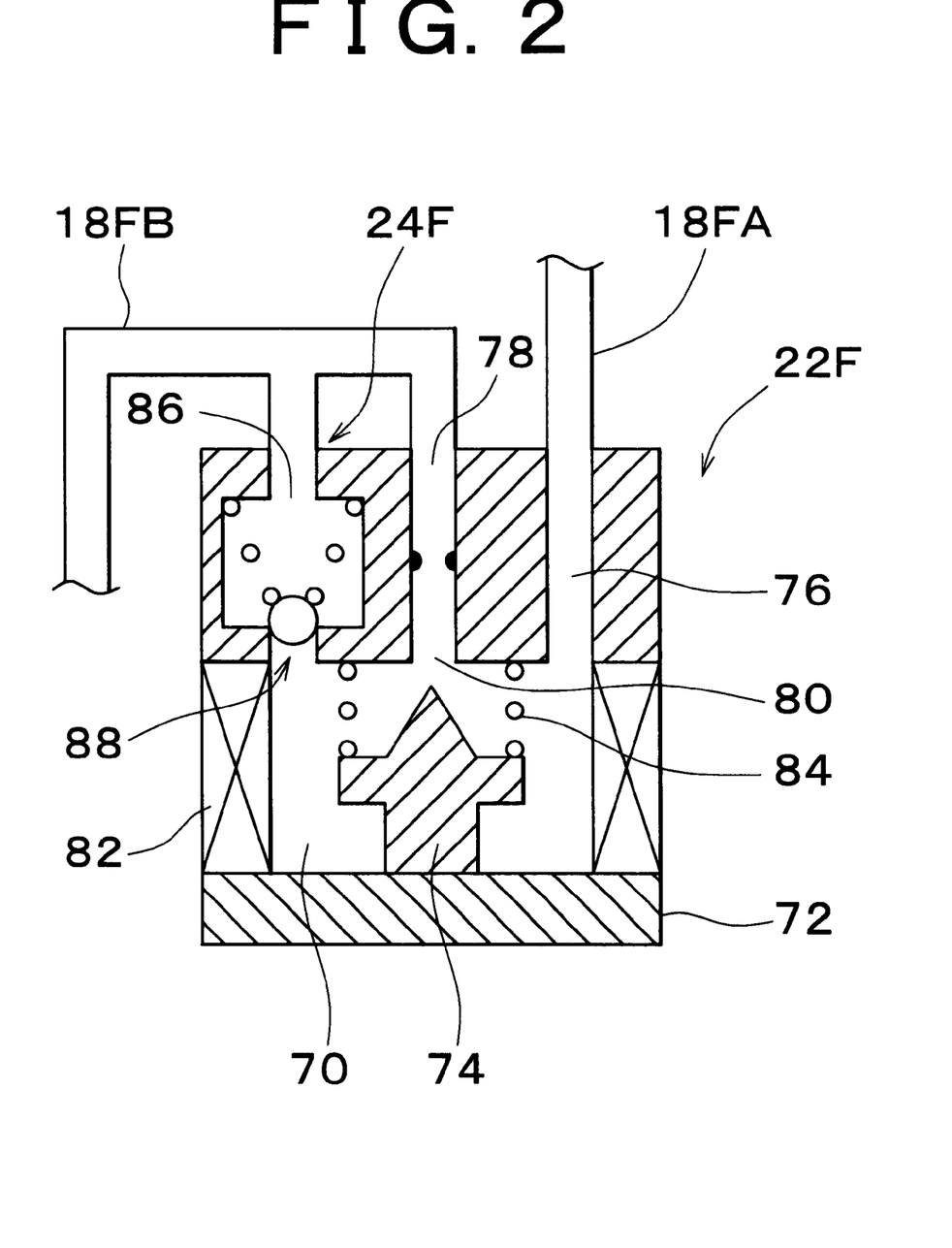
FIG. 2 is a sectional view showing a control valve for a front wheel shown in FIG. 1A.

FIG. 1A is a block diagram schematically showing a hydraulic circuit of one exemplary embodiment of a brake control system according to this invention. FIG. 1B is a block diagram schematically showing an electronic control unit for controlling the hydraulic circuit shown in FIG. 1A. FIG. 2 is an explanatory sectional view of a control valve for a front wheel shown in FIG. 1A. An electromagnetically driven solenoid provided for each value is not shown in FIG. 1A.

Referring to FIG. 1A, a hydraulic brake system 10 includes a master cylinder 14 that supplies brake fluid (e.g., oil) under pressure in response to a depressing operation of a brake pedal 12 by a vehicle operator. The master cylinder 14 includes a first master cylinder chamber 14A and a second master cylinder chamber 14B defined by a free piston 16 urged into a predetermined position by a compressed coil spring on each side of master cylinder 14.

There is an oil flow path between the first master cylinder chamber 14A and the left and right front wheel brake hydraulic control lines 20FL and 20FR, respectively, via the brake hydraulic control line 18F. In this brake hydraulic control line 18F are provided a control valve 22F and a bypass line 24F with a check valve. The control valve 22F is an electromagnetic switching valve that is open during normal operation. The bypass line 24F with a check valve bypasses the control valve 22F and only allows the oil to flow from the first master cylinder chamber 14A towards the brake hydraulic control line 20FL or 20FR.

Referring to FIG. 2, the control valve 22F has a housing 72 which defines a valve chamber 70 on the inside. A valve element 74 is reciprocatably disposed in the valve chamber 70. A portion 18FA of the brake hydraulic control line 18F on the side toward the master cylinder 14 is communicated with the valve chamber 70 via an internal passage 76. Moreover, a portion 18FB of the brake hydraulic control line 18F on a side away from the master cylinder 14 is communicated with the valve chamber 70 via an internal passage 78 and a port 80.

As shown in the FIG. 2, a solenoid 82 is disposed around the valve element 74 which is urged into a valve open position by a compression coil spring 84. When voltage is applied to drive the solenoid 82, the valve element 74 is urged toward the port 80 against the spring force of the compressed coil spring 84 such that the valve 22F closes with the closing of the port 80.

Also, when the control valve 22F is in the closed position, if the sum of the force from the pressure within the portion 18FB of the brake hydraulic control line 18F on the side away from the master cylinder 14 and the spring force of the compression coil spring 84 becomes greater than the electromagnetic force from the solenoid 82, the valve element 74 separates from the port 80, thereby opening the port 80. As a result, the oil within the portion 18FB flows through the internal passage 78, the port 80, the valve chamber 70 and the internal passage 76 into the portion 18FA of the brake hydraulic control line 18F. When the pressure of the oil within the portion 18FB drops due to the flow of the oil, the sum of the force from the pressure within the portion 18FB and the spring force of the compressed coil spring 84 becomes lower than the electromagnetic force from the solenoid 82. Accordingly the valve element 74 closes the port 80 again.

In this way, the control valve 22F controls the pressure within the portion 18FB of the brake hydraulic control line 18F in accordance with the voltage applied to the solenoid 82 thereof. As a result, the pressure within the portion 18FB (hereinafter referred to in this specification as "upstream pressure") is able to be controlled to a desired pressure with the control valve 22F by controlling the voltage to drive the solenoid 82.

Referring to FIG. 2, in the illustrated exemplary embodiment the check bypass line 24F shown in FIG. 1A is housed within the control valve 22F and includes an internal passage 86 and a check valve 88 provided midway in the internal passage 86, which allows the oil to flow only from the valve chamber 70 toward the portion 18FB.

Referring back to FIG. 1A, a wheel cylinder 26FL for controlling a braking force of the left front wheel is connected to the other end of the left front wheel brake hydraulic control line 20FL, and a wheel cylinder 26FR for controlling a braking force of the right front wheel is connected to the other end of the right front wheel brake hydraulic control line 20FR. Electromagnetic switching valves 28FL and 28FR, which are open during normal operation, are provided midway in the left front brake hydraulic control line 20FL and the right front brake hydraulic control line 20FR, respectively. A check bypass line 30FL which allows oil to flow only from the wheel cylinder 26FL toward the brake hydraulic control line 18F is connected to the brake hydraulic control line 20FL on both sides of the electromagnetic switching valve 28FL, and a check bypass line 30FR which allows oil to flow only from the wheel cylinder 26FR toward the brake hydraulic control line 18F is connected to the brake hydraulic control line 20FR on both sides of the electromagnetic switching valve 28FR.

One end of an oil discharge line 32FL is connected to the brake hydraulic control line 20FL between the electromagnetic switching valve 28FL and the wheel cylinder 26FL, and one end of an oil discharge line 32FR is connected to the brake hydraulic control line 20FR between the electromagnetic switching valve 28FR and the wheel cylinder 26FR. Electromagnetic switching valves 34FL and 34FR, which are closed during normal operation, are disposed midway in the oil discharge lines 32FL and 32FR, respectively. The other end of the both oil discharge lines 32FL and 32FR is connected to a front wheel buffer reservoir 38F via a connecting line 36F.

The electromagnetic switching valves 28FL and 28FR are increase pressure valves for selectively increasing and maintaining the pressure within the wheel cylinders 26FL and 26FR, respectively. The electromagnetic switching valves 34FL and 34FR are decrease pressure valves for decreasing the pressure within the wheel cylinders 26FL and 26FR, respectively. Therefore, the electromagnetic switching valves 28FL and 34FL define increase and decrease pressure valves respectively that work together to selectively increase, decrease and maintain the pressure within the left front-wheel wheel cylinder 26FL, and the electromagnetic switching valves 28FR and 34FR define increase and decrease pressure valves respectively that work together to selectively increase, decrease and maintain the pressure within the right front-wheel wheel cylinder 26FR.

The connecting line 36F is connected to an intake side of a pump 42F via a connecting line 40F. Two check valves 44F and 46F which allow the oil to flow only from the connecting line 36F toward the pump 42F are provided midway in the connecting line 40F. The discharge side of the pump 42F is connected to the brake hydraulic control line 18F via a connecting line 50F which has a damper 48F in the middle. A check valve 52F which allows the oil to flow only from the pump 42F toward the damper 48F is provided in the connecting line 40F between the pump 42F and the damper 48F.

One end of the connecting line 54F is connected to the connecting line 40F between the two check valves 44F and 46F, and the other end of the connecting line 54F is connected to the brake hydraulic control line 18F between the first master cylinder chamber 14A and the control valve 22F. An electromagnetic switching valve 60F, which is closed during normal operation, is provided midway in the connecting line 54F. This electromagnetic switching valve 60F functions as a pump intake valve for controlling communication between the brake hydraulic control line 18F, which is between the master cylinder 14 and the control valve 22F, and the intake side of the pump 42F.

Similarly, one end of a rear wheel brake hydraulic control line 18R is connected to the second master cylinder chamber 14B, and one end of a left rear wheel brake hydraulic control line 20RL and one end of a right rear wheel brake hydraulic control line 20RR are connected to the other end of the brake hydraulic control line 18R. A rear wheel control valve 22R, which is an electromagnetic switching valve that is open during normal operation, is provided midway in the brake hydraulic control line 18R.

The control valve 22R has the same structure as the structure of the front wheel control valve 22F shown in FIG. 2. Therefore, by controlling the voltage for driving the solenoid (not shown), it is possible to control the pressure within the brake hydraulic control line 18R (upstream pressure), which is on the downstream side of the control valve 22R, to a desired pressure. Furthermore, a check bypass valve 24R that allows the oil to flow only from the second master cylinder chamber 14B toward the brake hydraulic control line 20RL or the brake hydraulic control line 20RR is connected to the brake hydraulic control line 18R on both sides of the control valve 22R.

An oil flow path is provided between the wheel cylinder 26RL for controlling braking force of the right rear wheel and the brake hydraulic control line 18R via the brake hydraulic control line 20RL. In this brake hydraulic control line 20RL are provided an electromagnetic switching valve 28RL and a bypass line 30RL with a check valve. The bypass line 30RL with a check valve bypasses the electromagnetic switching valve 28RL and only allows the oil to flow in the direction from the wheel cylinder 26RL to the brake hydraulic control line 18R. There is also another similar oil flow path in which the wheel cylinder 26LL corresponds to the wheel cylinder 26RL, the brake hydraulic control line 20RR corresponds to the brake hydraulic control line 20RL, and a bypass line 30RR with a check valve corresponds to the bypass line 30RL with a check valve.

One end of an oil discharge line 32RL is connected to the brake hydraulic control line 20RL between the electromagnetic switching valves 28RL and the wheel cylinder 26RL, and one end of an oil discharge line 32RR is connected to the brake hydraulic control line 20RR between the electromagnetic switching valves 28RR and the wheel cylinder 26RR. The electromagnetic switching valves 34RL and 34RR, which are closed during normal operation, are provided midway in the oil discharge lines 32RL and 32RR, respectively. The other end of the oil discharge line 32RL and the other end of the oil discharge line 32RR are connected to a rear wheel buffer reservoir 38R via a connecting line 36R.

Just as with the front wheel side, the electromagnetic switching valves 28RL and 28RR are increase pressure valves for selectively increasing and maintaining the pressure within the wheel cylinders 26RL and 26RR, respectively. The electromagnetic switching valves 34RL and 34RR are decrease pressure valves for decreasing the pressure within the wheel cylinders 26RL and 26RR, respectively. Therefore, the electromagnetic switching valves 28RL and 34RL define increase and decrease pressure valves respectively that work together to selectively increase, decrease and maintain the pressure within the left rear-wheel wheel cylinder 26RL, and the electromagnetic switching valves 28RR and 34RR define increase and decrease pressure valves respectively that work together to selectively increase, decrease and maintain the pressure within the right rear-wheel wheel cylinder 26RR.

The connecting line 36R is connected to the intake side of the pump 42R via the connecting line 40R and two check valves 44R and 46R that allow the oil to flow only from the connecting line 36R toward the pump 42R are provided midway in the connecting line 40R. The discharge side of the pump 42R is connected to the brake hydraulic control line 18R via a connecting line 50R that has a damper 48R provided midway therein. A check valve 52R that only allows the oil to flow from the pump 42R toward the damper 48R is provided in the connecting line 50R between the pump 42R and the damper 48R. The pumps 42F and 42R are driven by a common electric motor (not shown in FIG. 1).

One end of the connecting line 54R is connected to the connecting line 40R, which is between the two check valves 44R and 46R. The other end of the connecting line 54R is connected to the brake hydraulic control line 18R, which is between the second master cylinder chamber 14B and the control valve 22R. The electromagnetic switching valve 60R, which is closed during normal operation, is provided midway in the connecting line 54R. This electromagnetic switching valve 60R also functions as a pump intake valve for controlling communication between the brake hydraulic control line 18R, which is between the master cylinder 14 and the control valve 22R, and the pump 42R.

According to the illustrated exemplary embodiment, each control valve and each switching valve is set to a non-control position, as shown in FIG. 1, when current is not running to drive the respective solenoids. Accordingly, pressure within the first master cylinder chamber 14A is supplied to the wheel cylinders 26FL and 26FR, and pressure within the second master cylinder chamber 14B is supplied to the wheel cylinders 26RL and 26RR. Therefore, during normal operation, the pressure within the wheel cylinder of each wheel, i.e., the braking force, is selectively increased and decreased in accordance with the depression force on the brake pedal 12.

In contrast, when the pumps 42F and 42R are driven in a state where the control valves 22F and 22R are switched to a closed position, the switching valves 60F and 60R are opened, and the switching valves of each wheel are in the positions shown in FIG. 1A, the oil within the master cylinder 14 is pumped up by the pumps 42F and 42R and the pressure generated by the pump 42F is supplied to the wheel cylinders 26FL and 26FR, while the pressure generated by the pump 42R is supplied to the wheel cylinders 26RL and 26RR. Therefore, the braking pressure of each wheel is selectively increased and decreased by selectively opening and closing the control valves 22F and 22R, as well as the switching valves 28RL, 28RR, 28FL, 28FR and 34RL, 34RR, 34FL, 34FR (increase and decrease pressure valves respectively) of each wheel regardless of the depression force on the brake pedal 12.

In this case, the pressure within the master cylinder 14 is increased when the switching valves 28FL through 28RR and the switching valves 34RL through 34RR are in a non-control position shown in FIG. 1A (i.e., increase pressure mode). The pressure within the master cylinder 14 is maintained when the switching valves 28FL through 28RR are switched to a closed position and the switching valves 34FL through 34RR are in a non-control position shown in FIG. 1 (i.e., a maintain pressure mode). The pressure within the master cylinder is decreased when the switching valves 28FL through 28RR and the switching valves 34FL through 34RR are switched to an open position (i.e., a decrease pressure mode).

The control valves 22F and 22R, the switching valves 28FL through 28RR, the switching valves 34RL through 34RR, and the switching valves 60F and 60R are each controlled by an electronic control unit 90, as will be described later. The electronic control unit 90 is constituted by a microcomputer 92 and a driving circuit 94. The microcomputer 92 can be of a typical structure that is well known in the technical field.

The microcomputer 92 receives a signal indicative of a master cylinder pressure Pm from a pressure sensor 96, a signal indicative of the lateral acceleration Gy of the vehicle from a lateral acceleration sensor 98, a signal indicative of the yaw rate γ of the vehicle from a yaw rate sensor 100, a signal indicative of a steering angle θ from a steering angle sensor 102, a signal indicative of the vehicle speed V from a vehicle speed sensor 104, and a signal indicative of whether a stop lamp switch is ON from a stop lamp switch (STPSW). Furthermore, the microcomputer 92 stores a brake control flow, to be described later, calculates a target brake pressure Pti (i=fl, fr, rl, rr) of left and right front wheels and left and right rear wheels according to that brake control flow, and controls the brake pressure Pi (i=fl, fr, rl, rr) of each wheel to the corresponding target brake pressure Pti by controlling the control valve 22F and the like.

In particular, in the illustrated exemplary embodiment, the electronic control unit 90 performs anti-skid control (denoted "ABS control" in the figure) by calculating the target brake pressure Pti of each wheel in accordance with a braking amount (master cylinder pressure Pm) by a vehicle operator, while calculating the target brake pressure Pti so as to decrease excessive brake slip of the wheels.

Also, the electronic control unit 90 in the exemplary embodiment shown in FIG. 1B increases the brake pressure of the front wheels as the product of Gy (lateral acceleration of the vehicle) and V (vehicle speed) becomes larger when braking the vehicle while turning. The electronic control unit 90 fully decreases the brake pressure of the rear wheel on the inside of the turn when the product of Gy and V is extremely large. Accordingly, when the vehicle operator is braking the vehicle while turning, the front and rear wheel braking force distribution control when braking the vehicle while turning is performed by controlling the front and rear wheel braking force distribution. As a result, more braking force is distributed to the front wheels than to the rear wheels such that increase in the yaw rate of the vehicle is prevented.

The electronic control unit 90 controls the brake pressures of the left and right wheels to the target brake pressure by controlling only the control valve 22F or 22R when the target brake pressures of the left and right wheels are the same. When the target brake pressures of the left and right wheels differ, the electronic control unit 90 sets the target upstream pressure to the target brake pressure of the left or the right wheel, whichever has the higher target brake pressure, such that the brake pressure Pi of the wheel with the higher target brake pressure Pti, of the left and right wheels, is controlled by controlling the upstream pressure to a target upstream pressure Ptf or Ptr by the control valve 22F or 22R. The brake pressures of the left and right wheels on the opposite side are controlled to the corresponding target brake pressures by the corresponding increase pressure valves and decrease pressure valves.

Also, the electronic control unit 90 determines whether the master cylinder pressure Pm is equal to, or greater than, the target brake pressure of the wheel when the brake pressure of the wheel with the higher target brake pressure should be decreased. When the master cylinder pressure is lower than the target brake pressure of the wheel, the electronic control unit 90 controls the control valve 22F or 22R so as to discharge, via the control valve, the oil within the brake hydraulic control line 18F or 18R that is between the control valve and the pump to the connecting line 54F or 54R, and thereby controls the upstream pressure and the pressure within the wheel cylinder to the target brake pressure.

Conversely, when the master cylinder pressure Pm is equal to, or greater than, the target brake pressure of the wheel, the electronic control unit 90 controls the opening and closing of the decrease pressure valve in a state in which the increase pressure valve has been opened, so as to discharge the oil within the wheel cylinder of which the pressure should be decreased to the buffer reservoirs 38F and 38R via the brake hydraulic control line 20FL and the like, as well as via the connecting lines 36F and 36R, and thereby controls the upstream pressure and the pressure within the wheel cylinder to the target brake pressure.

A brake control routine during turning while braking according to the illustrated exemplary embodiment will now be explained with reference to the flowchart shown in FIG. 3. The control according to the flowchart shown in FIG. 3 is performed repeatedly at predetermined intervals of time, starting from when an ignition switch (not shown) is turned on.

Figure 3:
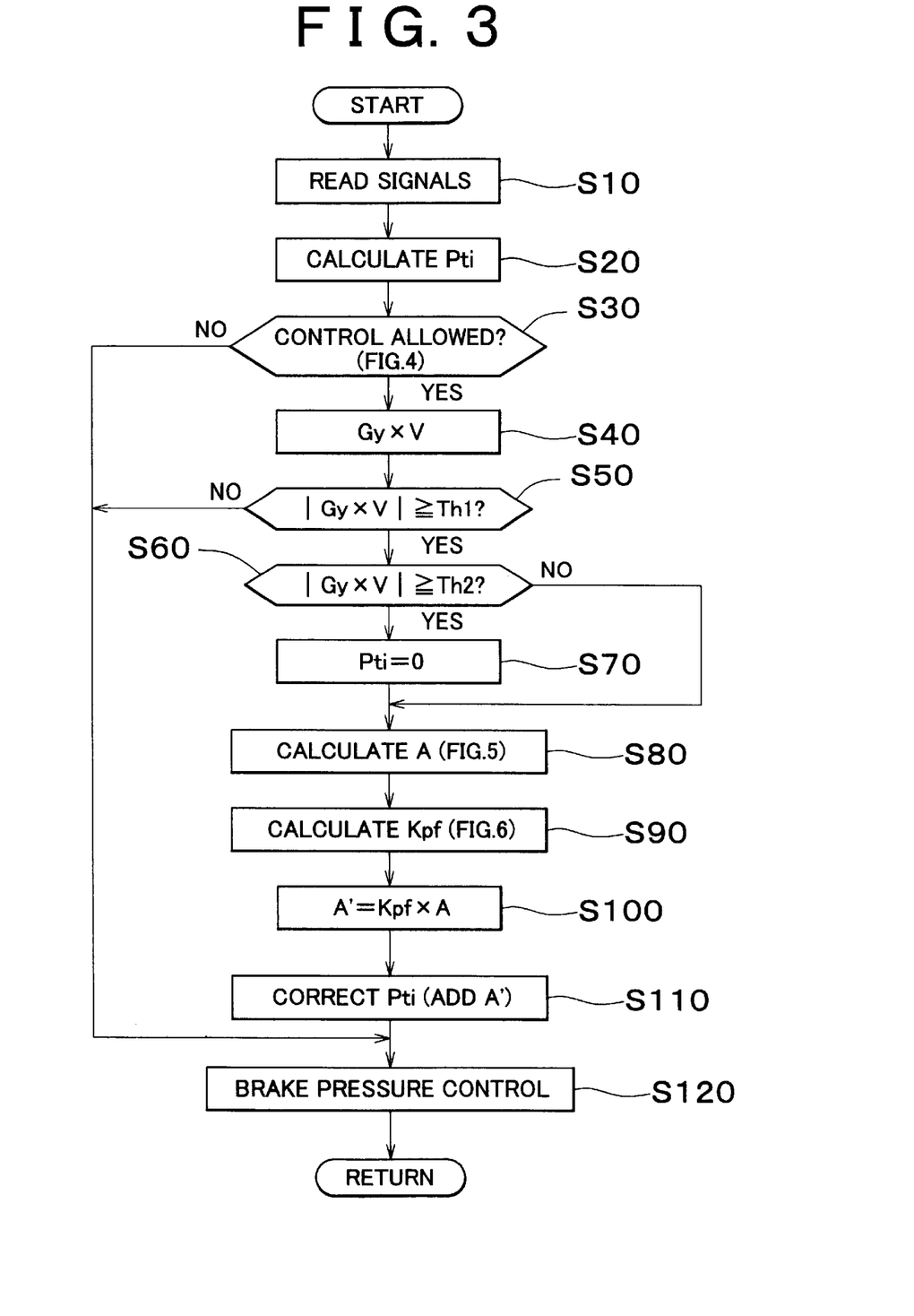
FIG. 3 is a flowchart showing a brake control routine according to the illustrated exemplary embodiment.

Referring to FIG. 3, in step S10, signals such as that indicating the master cylinder pressure Pm detected by the pressure sensor 96 are read. In step S20, the target brake pressure Pti of each wheel is calculated based on the master cylinder pressure Pm. Also, when anti-skid control is necessary, the target brake pressure Pti required for reducing excessive brake slip of the wheel is calculated in a way well known in the technical field. Although not shown in FIG. 3, the electromagnetic switching valves 60F and 60R are opened and the oil pumps 42F and 42R start to drive upon start of the control routine.

In step S30, it is determined whether execution of front and rear wheel braking force distribution control, when braking the vehicle while braking, is allowed as will be described later, according to a control routine shown in FIG. 4. If YES is obtained in step S30, the process proceeds to step S40. If NO is obtained in step S30, the process proceeds directly to step S120.

In step S40, the product of Gy (lateral acceleration of the vehicle) and V vehicle speed) is calculated. In step S50, it is determined whether the absolute value of the product of Gy and V is equal to, or greater than, a first reference value Th1 (a positive constant). If NO is obtained in step S50, the process proceeds directly to step S120. If YES is obtained in step S50, the process proceeds to step S60.

In step S60, it is determined whether the absolute value of the product of Gy and V is equal to, or greater than, a second reference value Th2 (a positive constant which is greater than Th1). If NO is obtained in step S60, the process proceeds to step S80. If YES is obtained in step S60, the process proceeds to step S70, where the turning direction of the vehicle is determined based on the steering angle θ and the like and the target brake pressure Pti (i=rl or rr) of the rear wheel on the inside of the turn is set to 0.

Figure 5:
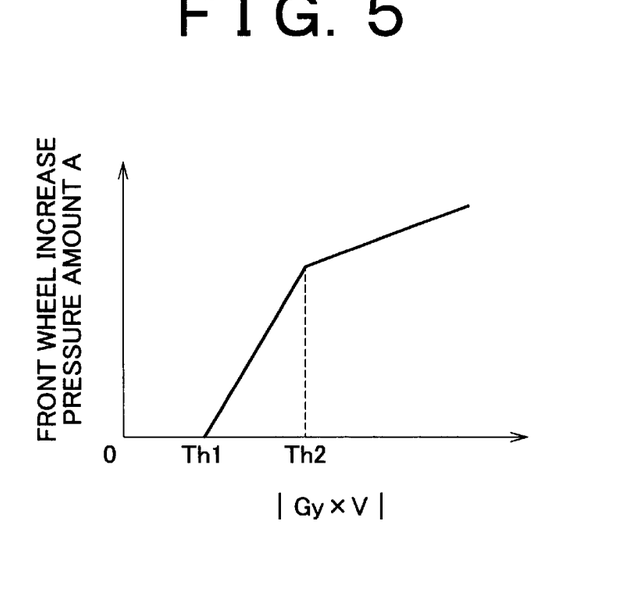
FIG. 5 is a graph showing a relationship between an absolute value of the product of Gy (lateral acceleration) and V (vehicle speed), and an increase amount A of the braking pressure applied to the front wheels.
Figure 6:
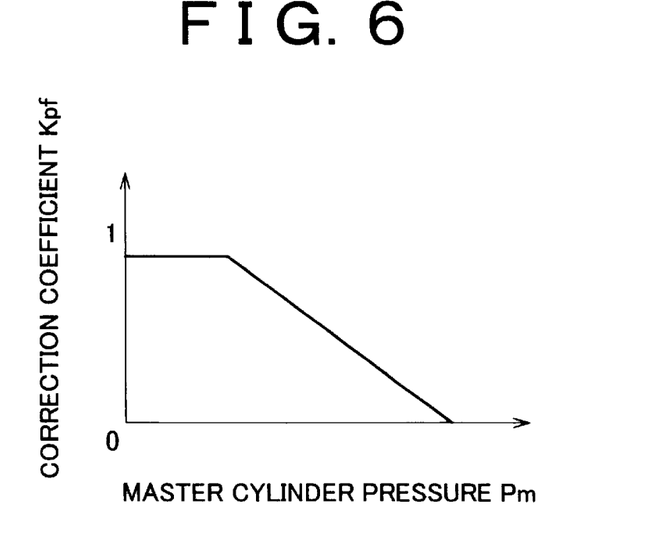
FIG. 6 is a graph showing a relationship between a master cylinder pressure Pm and a correction coefficient Kpf.

In step S80, a pressure increase amount A of the brake pressure on the front wheel is calculated according to a map corresponding to a graph shown in FIG. 5 based on the absolute value of the product of Gy and V. In step S90, the correction coefficient Kpf is calculated according to a map corresponding to a graph shown in FIG. 6 based on the master cylinder pressure Pm. In step S100, the pressure increase amount A of the brake pressure on the front wheel is corrected to the product of the correction coefficient Kpf and the pressure increase amount A. As a result, a pressure increase amount A' of the brake pressure on the front wheel after correction is calculated.

In step S110, left and right front wheel target brake pressures Ptfl and Ptfr are corrected by respectively adding the pressure increase amount A' after correction to those target brake pressures Ptfl and Ptfr. Then in step S120, the control valves 22F and 22R are controlled such that the brake pressure applied to each wheel becomes equal to its target brake pressure, and, when necessary, the electromagnetic switching valve 34RL or 34RR is opened. The process then returns to step S10.

Figure 4:
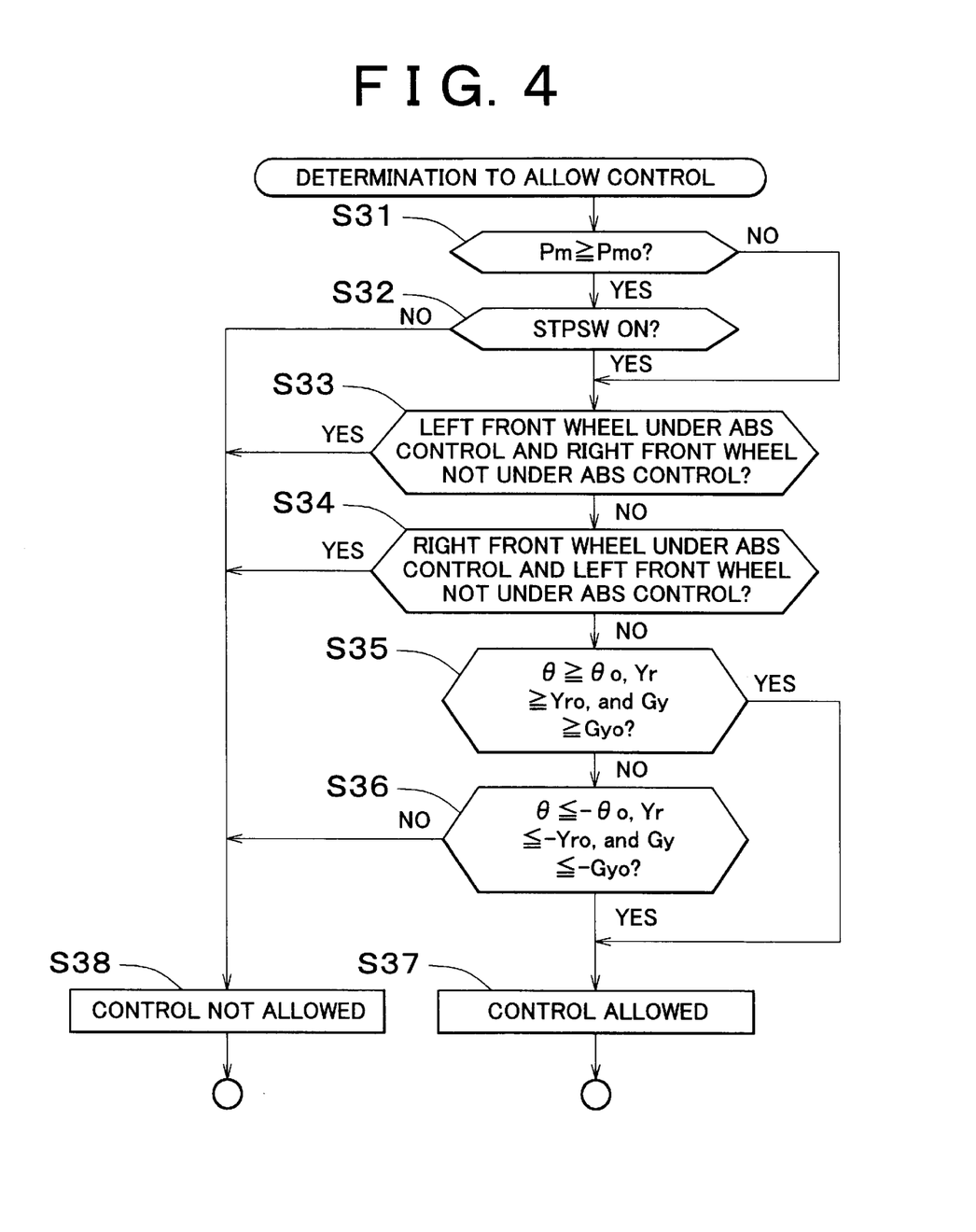
FIG. 4 is a flowchart showing a control scheme executed in step 20 of the flowchart shown in FIG. 3, in which it is determined whether execution of the front and rear wheel braking force distribution control is allowed or inhibited.

Referring to FIG. 4, in step S31, the control routine determines whether execution of the front and rear wheel braking force distribution control is allowed. It is also determined whether a master cylinder pressure Pmt is equal to, or greater than, a reference value Pmo (a positive numerical constant smaller than the first reference value Th1). If NO is obtained in step S31, the process proceeds to step S33. If YES is obtained in step S31, the process proceeds to step S32, where it is determined whether a stop lamp switch 106 is ON. If NO is obtained in step S32, the process proceeds to step S38. If YES is obtained in step S32 is YES, the process proceeds to step S33.

In step S33, it is determined whether the anti-skid control is being performed on the left front wheel and is not being performed on the right front wheel. If YES is obtained, the process proceeds to step S38. If NO is obtained, the process proceeds to step S34. In step S34, it is determined whether the anti-skid control is being performed on the right front wheel and is not being performed on the left front wheel. If YES is obtained, the process proceeds to step S38. If NO is obtained, the process proceeds to step S35.

In step S35, it is determined whether the steering angle $\theta$ is equal to, or greater than, a reference value $\theta$o (a positive constant), whether the yaw rate Yr of the vehicle is equal to, or greater than, a reference value Yro (a positive constant), and whether the lateral acceleration Gy of the vehicle is equal to, or greater than, a reference value Gyo (a positive value). If YES is obtained in step S35, the process proceeds to step S37. If NO is obtained in step S35 is NO, the process proceeds to step S36. In step S36, it is determined whether the steering angle $\theta$ is equal to, or less than, a reference value $-\theta$, whether the yaw rate Yr of the vehicle is equal to, or less than, a reference value $-$Yro, and whether the lateral acceleration Gy of the vehicle is equal to, or less than, a reference value $-$Gyo. If YES is obtained in step S36, the process proceeds to step S37. In step S37, it is determined that execution of the front and rear wheel braking force distribution control when braking the vehicle while turning is allowed. If NO is obtained in step S36, the process proceeds to step S38. In step S38, it is determined that execution of the front and rear wheel braking force distribution control when braking the vehicle while turning is not allowed.

In steps S31 and S32, it is determined whether braking is being performed by the vehicle operator. In steps S33 and S34, it is determined whether the road has an uneven friction coefficient which is extremely different in right and left areas thereof which correspond to the respective right and left wheels, i.e., a so-called uneven friction-coefficient road surface. In steps S35 and S36, it is determined whether the vehicle is turning. If the vehicle is turning while braking and the road surface is not the uneven friction-coefficient road surface, execution of the front and rear wheel braking force distribution control is allowed. If YES is obtained in steps S31 and S32, it is determined that the vehicle operator is braking the vehicle. The process, then, proceeds to step S33.

Therefore according to the illustrated exemplary embodiment of the invention, in step S20 of the control routine as shown in FIG. 3, the target brake pressure Pti of each wheel is calculated based on the braking amount (master cylinder pressure Pm) by the vehicle operator. In step S40, the product of Gy (lateral acceleration) and V (vehicle speed) is calculated. If the absolute value of the product of Gy and V is equal to, or greater than, the first reference value Th1 and less than the second reference value Th2, YES is obtained in step S50 and NO is obtained in step S60, respectively. Then in steps S80 through S100, the pressure increase amount A' of the braking pressure on the front wheel is calculated so as to become greater as the absolute value of the product of Gy and V becomes larger. Accordingly, the brake pressure of the front wheel is increased so as to become greater as the product of Gy and V becomes larger.

More braking force is distributed to the front wheels compared with the braking force distributed to the rear wheels as the product of Gy and V becomes larger. Accordingly, it is possible to prevent the yaw rate of the vehicle from increasing in the direction of the turn, enabling stable turning of the vehicle while braking. Further, the braking force of the front wheels increases without reducing the braking force of the rear wheels. Thus, it is possible to reliably prevent the decrease in deceleration of the vehicle. Accordingly, it is possible to reliably prevent the vehicle operator from feeling discomfort due to decrease in vehicle deceleration.

The braking force of the entire vehicle increases as the braking force of the front wheels increases. However, the vehicle operator is able to avoid the increase in the braking force of the entire vehicle by reducing the depression amount of the brake pedal when the deceleration of the vehicle becomes too great owing to the increase in the braking force of the entire vehicle. Thus, it is still possible to achieve a vehicle deceleration desired by the vehicle operator by increasing the braking force of the front wheels.

Also, when the absolute value of the product of Gy and V is equal to, or greater than, the second reference value Th2, YES is obtained both in steps S50 and S60. In steps S80 through S100, the pressure increase amount A' of the braking pressure of the front wheel is calculated so as to become greater as the absolute value of the product of Gy and V becomes larger. Accordingly, the brake pressure of the front wheels is increased so as to become greater as the product of Gy and V becomes larger. Also, in step S70, the target brake pressure of the rear wheel on the inside of the turn is set to 0. In step S120, the decrease pressure valves 34RL or 34RR are opened so as to filly decrease the brake pressure of the wheel on the inside of the turn, thus reducing the braking force of the rear wheels.

Therefore, when the absolute value of the product of Gy and V is equal to, or greater than, the second reference value Th2. That is, when the vehicle yaw rate has a tendency to increase further, the braking force is distributed even more to the front wheels than it is to the rear wheels, compared to the case in which the absolute value of the product of Gy and V is equal to, or greater than, the first reference value Th1 and less than the second reference value Th2. This makes it possible to prevent the yaw rate of the vehicle from increasing in the direction of the turn, thus enabling stable turning of the vehicle while braking. Furthermore, because the braking force of the front wheels is increased while the braking force of the rear wheels is decreased, it is possible to reliably prevent the braking force of the entire vehicle from becoming excessive and the vehicle deceleration from becoming excessive.

In particular, according to the illustrated exemplary embodiment, the correction coefficient Kpf is calculated in step S90 so as to become smaller as the master cylinder pressure Pm becomes larger. The pressure increase amount A of the brake pressure of the front wheel is corrected to the product of the correction coefficient Kpf and the pressure increase amount A in step S100. Therefore, it is possible to reliably reduce the possibility of deterioration of the turning characteristics of the vehicle due to reduction in the lateral force of the front wheels caused by excessive braking force of the front wheels resulting from the increase in the brake pressure of the front wheels in the case where the braking amount applied by the vehicle operator is large and the braking force of the wheels generated by the braking operation of the vehicle operator is large.

In the illustrated exemplary embodiment, the brake pressure of the rear wheel on the inside of the turn is only reduced in step S70, it is possible to reduce the possibility of decrease in the vehicle deceleration, compared with the case of decrease in the brake pressure of both the left and right rear wheels. It is also possible to apply the anti-spin moment caused by the difference in the braking force of the left and right rear wheels to the vehicle so as to effectively reduce the possibility of bringing the vehicle into a spin state.

In the illustrated exemplary embodiment, the target brake pressure of the rear wheel on the inside of the turn is set to 0 in step S70. This is because the intermittent opening and closing of those valves tends to produce an abnormal noise when the rear wheel brake pressure is reduced by intermittently opening and closing the electromagnetic switching valves 34RL and 34RR to decrease the pressure with the illustrated brake system.

In the illustrated exemplary embodiment, when the absolute value of the product of Gy and V is equal to, or greater than, the second reference value Th2, the rate of increase in the pressure increase amount A with respect to the product of Gy and V is smaller compared with the case when the absolute value of the product of Gy and V is equal to, or less than, the second reference value Th2. Therefore, it is possible to reduce the possibility of deterioration of the turning characteristics of the vehicle due to reduction in the lateral force of the front wheels caused by excessive braking force of the front wheels in a large range in which the product of Gy and V is equal to, or greater than, the reference value Th2.

In the illustrated exemplary embodiment, in step S30, it is determined whether execution of the front and rear wheel braking force distribution control is allowed. Step 840 and subsequent steps are only performed when braking the vehicle by the vehicle operator, the road surface is not an uneven friction-coefficient road surface, and the vehicle is turning. Accordingly, the possibility of unnecessary execution of the front and rear wheel braking force distribution control is reliably reduced, compared with the case, unlike step S30, in which it is not determined whether execution of the front and rear wheel braking force distribution control is allowed. In particular, as the front and rear wheel braking force distribution control is not executed when the road has an uneven friction-coefficient surface, it is possible to reliably prevent deterioration of vehicle behavior caused by the front and rear wheel braking force distribution control being performed when the road surface is an uneven friction-coefficient road surface.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

For example, in the illustrated exemplary embodiment, the brake system is a hydraulic brake system 10 in which the control valve 22F or 22R is controlled when the target brake pressures of the left and right wheels are the same, and the electromagnetic switching valves 28FL through 28RR, which serve as increase pressure valves, or the electromagnetic switching valves 34FL through 34RR, which serve as decrease pressure valves, are controlled in addition to the control valves when the target brake pressures of the left and right wheels differ from one another. However, according to another exemplary embodiment, the brake system to which the brake control system of this invention can be applied can also be a hydraulic brake system or an electronic brake system of any structure well known in the technical field, so far as the braking force of each wheel can be individually controlled to its respective target braking force.

Also, according to the illustrated exemplary embodiment, the target brake pressure of the rear wheel on the inside of the turn is set to 0 when the absolute value of the product of the lateral acceleration Gy of the vehicle and the vehicle speed V is equal to, or greater than, the second reference value Th2. However, according to another exemplary embodiment, when the brake system is configured such that the brake pressure of each wheel can be selectively continually increased and decreased, the decrease pressure amount B of the rear wheel on the inside of the turn can be calculated in step S70 according to a map corresponding with the graph shown in FIG. 7 based on the absolute value of the product of the lateral acceleration Gy of the vehicle and the vehicle speed V. Then, in step S110, the target brake pressure of the left and right front wheels can be increase-corrected by the increase pressure amount A' and the target brake pressure of the rear wheel on the inside of the turn can be decrease-corrected by the decrease pressure amount B.

Figure 7:
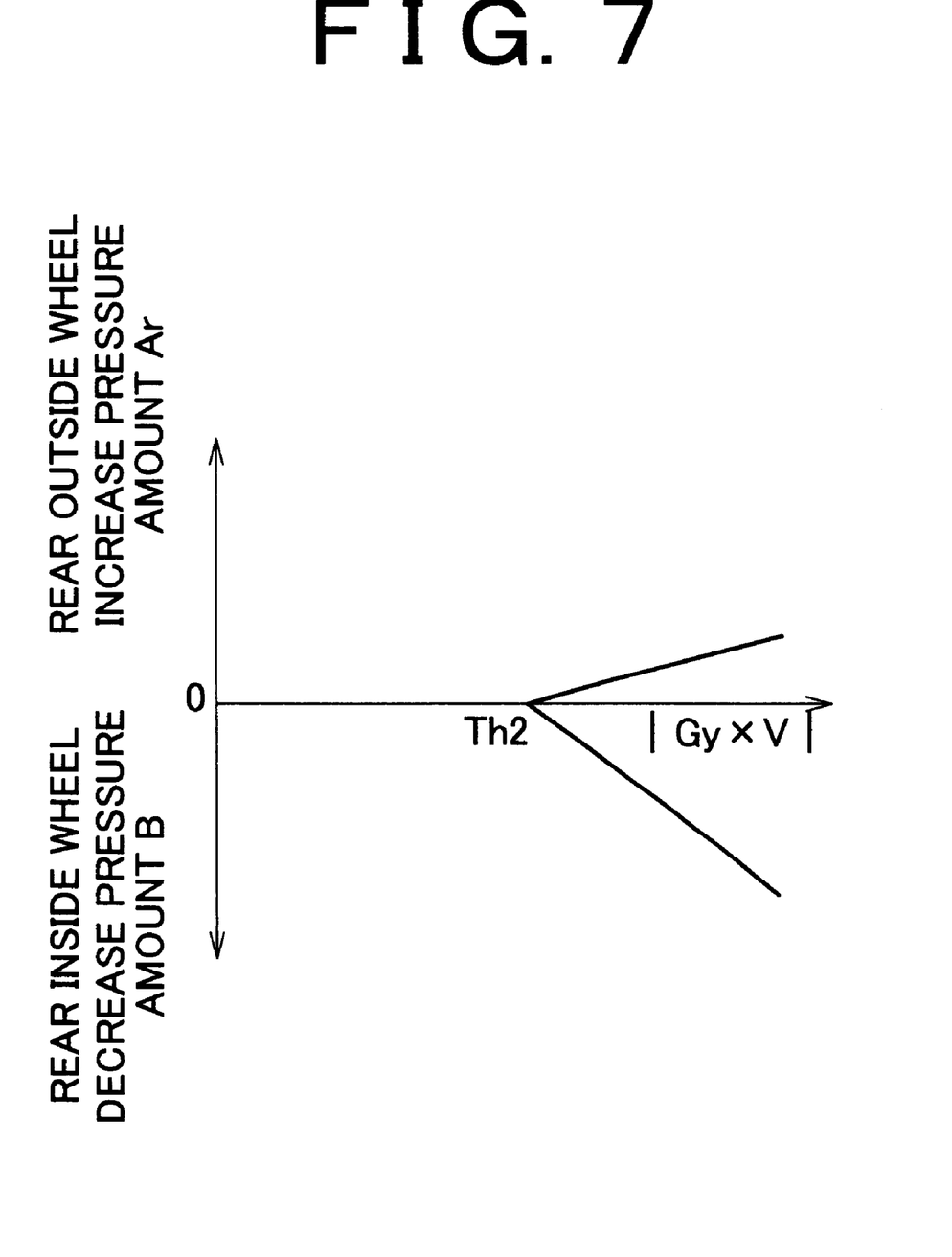
FIG. 7 is a graph showing a relationship between an absolute value of the product of Gy (lateral acceleration) and V (vehicle speed), and a pressure decrease amount B of the rear wheel on the inside of the turn and a pressure increase amount Ar of the rear wheel on the outside of the turn.

Alternatively, according to another exemplary embodiment, the decrease pressure amount B of the rear wheel on the inside of the turn and the increase pressure amount Ar of the rear wheel on the outside of the turn can be calculated in Step S70 according to a map corresponding to the graph shown in FIG. 7 based on the absolute value of the product of the lateral acceleration Gy of the vehicle and the vehicle speed V. Then, in Step S110, the target brake pressure of the left and right front wheels can be increase-corrected by the increase pressure amount A', the target brake pressure of the rear wheel on the inside of the turn can be decrease-corrected by the decrease pressure amount B, and the target brake pressure of the rear wheel on the outside of the turn can be increase-corrected by the increase pressure amount Ar.

According to these modified exemplary embodiments, it is possible to prevent the braking force of the entire vehicle from changing greatly when the product of the lateral acceleration Gy of the vehicle and the vehicle speed V changes in the vicinity of the second reference value Th2. As a result, it is possible to improve the stability of the vehicle when turning while braking even more than with the foregoing exemplary embodiment. In these modified embodiments, the second reference value Th2 can also be set to the same value as the first reference value Th1.

Also, according to the illustrated exemplary embodiment, the brake pressure of each wheel is controlled to an individual target brake pressure in step S120 by controlling the control valve 22F and the electromagnetic switching valves which serve as increase pressure valves or the electromagnetic switching valves which serve as decrease pressure valves. However, according to another exemplary embodiment, the pressure of the wheel cylinders 22FL through 26RR of the wheels can also be detected and the brake pressure of each wheel can be feedback-controlled.

According to the illustrated exemplary embodiment, the target brake pressure Pti of each wheel is calculated either based on the braking amount by the vehicle operator, or to reduce brake slip of the wheels for the purpose of anti-skid control. However, according to another exemplary embodiment, the target brake pressure Pti can also be calculated for the purpose of any vehicle control well known in the technical field such as vehicle behavior control by braking force control, and traction control and the like.

Also, according to the illustrated exemplary embodiment, the valves are set to the control position even when the vehicle operator is not braking. However, according to another exemplary embodiment, the valves can be set to the non-control position shown in FIG. 1A when there is no need to control the brake pressure of the wheels.

In the illustrated embodiment, the electronic control unit 90, or controller, is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

What is claimed is:

1. A brake control system for a vehicle, comprising:
   a first detector that detects a lateral acceleration of the vehicle;
   a second detector that detects a speed of the vehicle; and
   a controller that controls a braking force applied to each of front wheels and rear wheels, wherein the controller increases the braking force applied to at least the front wheels so that the ratio of the braking force applied to the front wheels versus the braking force applied to the rear wheels increases as a product of the detected lateral acceleration and the detected speed of the vehicle increases.

2. A brake control system according to claim 1, wherein the controller corrects an amount of increase in the braking force applied to the front wheels on the basis of the absolute value of a product of the detected lateral acceleration and the detected speed of the vehicle so as to prevent the braking force applied to the front wheels from exceeding a predetermined range when a braking amount applied to the vehicle by an operator becomes large.

3. A brake control system according to claim 1, wherein the controller:
   determines whether the vehicle is turning while braking; and
   controls the braking force applied to at least one of the front wheels and rear wheels on the basis of the absolute value of a product of the detected lateral acceleration and the detected speed of the vehicle when the controller determines that the vehicle is turning while braking.

4. A brake control system according to claim 3, wherein the controller:
   determines whether a road on which the vehicle is travelling has an uneven friction coefficient that is different in a right area and a left area of the road which correspond to the right and left wheels respectively, and
   inhibits controlling of the braking force applied to the at least one of the front wheels and the rear wheels on the basis of the absolute value of the product of the detected lateral acceleration and the detected speed of the vehicle when the controller determines that the road has the uneven friction coefficient that is different in right and left areas of the road.

5. A brake control system according to claim 1, wherein the controller:
   calculates a target braking force applied to each of the front wheels and the rear wheels on the basis of a braking amount applied to the vehicle by an operator; and
   corrects the target braking force applied to the front wheels so as to be increased as an absolute value of the product of the detected lateral acceleration and the detected speed of the vehicle increases.

6. A brake control system according to claim 1, wherein the controller:
   increases the braking force applied to the front wheels when an absolute value of a product of the detected lateral acceleration and the detected speed of the vehicle is equal to or greater than a first predetermined value and is less than a second predetermined value; and
   increases the braking force applied to the front wheels and decreases the braking force applied to the rear wheels when the absolute value of the product of the detected lateral acceleration and the detected speed of the vehicle is equal to or greater than the second predetermined value.

7. A brake control system according to claim 6, wherein the controller corrects an amount of increase in the braking force applied to the front wheels on the basis of the absolute value of the product of the detected lateral acceleration and the detected speed of the vehicle so as to prevent the braking force applied to the front wheels from exceeding a predetermined range when a braking amount applied to the vehicle by an operator becomes large.

8. A brake control system according to claim 6, wherein a rate of increase in the braking force applied to the front wheels when the absolute value of the product of the detected lateral acceleration and the detected speed of the vehicle is equal to or greater than the second predetermined value is smaller than the amount of increase in the braking force applied to the front wheels when the absolute value of the product of the detected lateral acceleration and the detected speed of the vehicle is equal to or greater than the first predetermined value and less than the second predetermined value.

9. A brake control system according to claim 6, wherein when the absolute value of the product of the detected lateral acceleration and the detected speed of the vehicle is equal to or greater than the second predetermined value, the controller sets the braking force applied to one of the rear wheels on an inside of a turning of the vehicle to 0.

10. A brake control system according to claim 6, wherein when the absolute value of the product of the detected lateral acceleration and the detected speed of the vehicle is equal to or greater than the second predetermined value, the controller reduces the braking force applied to one of the rear wheels on an inside of a turning of the vehicle as the absolute value of the product increases.

11. A brake control system according to claim 6, wherein when the absolute value of the product of the detected lateral acceleration and the detected speed of the vehicle is equal to or greater than the second predetermined value, the controller reduces the braking force applied to one of the rear wheels on an inside of a turning of the vehicle as the absolute value of the product becomes larger, and increases the braking force applied to the other of the rear wheels on an outside of a turning of the vehicle as the absolute value of the product becomes smaller.

12. A method of controlling a brake control system in a vehicle, comprising:

detecting a lateral acceleration of the vehicle;

detecting a speed of the vehicle;

controlling a braking force applied to at least one of a front wheel and a rear wheel; and increasing the braking force applied to at least the front wheels so that the ratio of the braking force applied to the front wheels versus the braking force applied to the rear wheels increases as a product of the detected lateral acceleration and the detected speed of the vehicle increases.

13. A method of controlling a brake control system according to claim 12, further comprising:

correcting an amount of increase in the braking force applied to the front wheels on the basis of the absolute value of a product of the detected lateral acceleration and the detected speed of the vehicle; and preventing the braking force applied to the front wheels from exceeding a predetermined range when a braking amount applied to the vehicle by an operator becomes large.

14. A method of controlling a brake control system according to claim 12, further comprising:

determining whether the vehicle is turning while braking; and controlling the braking force applied to at least one of the front wheels and rear wheels on the basis of the absolute value of a product of the detected lateral acceleration and the detected speed of the vehicle when the vehicle is determined to be turning while braking.

15. A method of controlling a brake control system according to claim 12, further comprising:

calculating a target braking force applied to each of the front wheels and the rear wheels on the basis of a braking amount applied to the vehicle by an operator; and correcting, by increasing the target braking force applied to the front wheels when an absolute value of the product of the detected lateral acceleration and the detected speed of the vehicle increases.

16. A method of controlling a brake control system according to claim 12, further comprising:

increasing the braking force applied to the front wheels when an absolute value of a product of the detected lateral acceleration and the detected speed of the vehicle is equal to or greater than a first predetermined value and is less than a second predetermined value; and increasing the braking force applied to the front wheels and decreases the braking force applied to the rear wheels when the absolute value of the product of the detected lateral acceleration and the detected speed of the vehicle is equal to or greater than the second predetermined value.

* * * * *